United States Patent [19]

Sporer et al.

[11] Patent Number: 5,883,670
[45] Date of Patent: *Mar. 16, 1999

[54] MOTION VIDEO PROCESSING CIRCUIT FOR CAPTURE PLAYBACK AND MANIPULATION OF DIGITAL MOTION VIDEO INFORMATION ON A COMPUTER

[75] Inventors: Michael Sporer, Wellesley; Mark H. Kline, North Andover, both of Mass.; Peter Zawojski, Merrimack, N.H.

[73] Assignee: Avid Technology, Inc., Tewksbury, Mass.

[*] Notice: This patent issued on a continued prosecution application filed under 37 CFR 1.53(d), and is subject to the twenty year patent term provisions of 35 U.S.C. 154(a)(2).

[21] Appl. No.: 691,985

[22] Filed: Aug. 2, 1996

[51] Int. Cl.[6] .............................. H04N 7/12; H04N 11/02; H04N 11/04; H04N 9/475

[52] U.S. Cl. ......................... 348/384; 348/510; 348/512; 348/441

[58] Field of Search .................................... 348/510, 512, 348/180, 441, 384, 423, 845.2; 395/972, 154; 386/87; 382/56

[56] References Cited

U.S. PATENT DOCUMENTS

| | | | |
|---|---|---|---|
| 5,243,447 | 9/1993 | Bodenkamp et al. | 345/133 |
| 5,287,420 | 2/1994 | Barrett | 382/56 |
| 5,373,327 | 12/1994 | McGee et al. | 348/645 |
| 5,432,900 | 7/1995 | Rhodes et al. | 395/154 |
| 5,499,050 | 3/1996 | Blades et al. | 348/180 |
| 5,528,301 | 6/1996 | Hau et al. | 348/441 |
| 5,589,993 | 12/1996 | Naimpally | 386/81 |

FOREIGN PATENT DOCUMENTS 0 665 513 A2  2/1995  European Pat. Off. .

OTHER PUBLICATIONS

Fronczak, D. et al., "Motion JPEG and MPEG Solutions for Multimedia," Nov. 1995, Wescon '95 Conference Record, pp. 738–742.

"New Image Acquisition IC for PC Video Capture Use," Electronic Engineering, vol. 67, No. 818, Feb. 1995, one page.

Willner, R., "Transforming the PCT into a TV, Radio, VCR, and Video Editing Studio," Nov. 1995, Wescon '95 Conference Record, pp. 743–748.

(List continued on next page.)

*Primary Examiner*—Hassan Kizou
*Assistant Examiner*—David R. Vincent
*Attorney, Agent, or Firm*—Wolf, Greenfield & Sacks, P.C.

[57] ABSTRACT

A digital motion video processing circuit can capture, playback and manipulate digital motion video information using the system memory of a computer as a data buffer for holding compressed video data from the circuit. The system memory may be accessed by the circuit over a standard bus. A controller in the circuit directs data flow between an input/output port which transfer a stream of pixel data and to the standard bus. The controller directs data to and from either the standard bus or the input/output port through processing circuitry for compression, decompression, scaling and buffering. The standard bus may be a peripheral component interconnect (PCI) bus. The motion video processing circuit has a data path including pixel data and timing data indicative of a size of an image defined by the pixel data. The timing data is used and/or generated by each component which processes the pixel data, thereby enabling each component to process the pixel data without prior knowledge of the image format. By having processors for handling two compression formats for motion video data connected to this data path, conversion between compression formats, such as between MPEG to Motion JPEG, can be performed.

14 Claims, 8 Drawing Sheets

OTHER PUBLICATIONS

Kroeker, E.J., "Challenges in Full–Motion Video/Audio for Personal Computers," Jan. 1993, SMPTE Journal, vol. 102, No. 1, pp. 24–31.

The Analog Devices Product literature on a ADV601 Codec and an ADV7175 encoder, 1996.

Electronic News, ADI video–compression IC ignores MPEG, Jun. 10, 1996.

Electronic Engineering Times, ADI to roll IC for video compression, May 27, 1996.

MOTION VIDEO PROCESSING CIRCUIT FOR CAPTURE PLAYBACK AND MANIPULATION OF DIGITAL MOTION VIDEO INFORMATION ON A COMPUTER

FIELD OF THE INVENTION

The present invention is related to computer systems which process motion video information represented as sequences of digital still images in a computer data file. Such processing includes capture, playback and manipulation of the motion video information.

BACKGROUND OF THE INVENTION

Several computer systems are presently available for capturing motion video information as a computer data file including data representative of a sequence of several digital still images. Such digitized data is often compressed, using common compression standards such as MPEG (Motion Picture Experts Group) and motion-JPEG (Joint Photographers Expert Group) compression.

One difficulty to overcome in video capture is that there are several formats in which video information may be received. These include square and nonsquare pixel formats from NTSC and PAL format video. Prior capture systems generally are designed such that prior knowledge of the video pixel data format is required.

Another difficulty to overcome in video capture is achieving a high compression ratio while maintaining good image quality upon decompression. Image quality is often inversely related to the compression ratio. The compression ratio also affects memory and bandwidth requirements. Achieving a low cost video capture circuit often involves reducing the amount of memory needed for the capture circuitry, as well as the size and complexity of the circuit.

A difficulty to overcome in video playback is that there are several formats in which motion video information may be needed. For example, motion video information may be stored in a different form of computer data file, requiring conversion, for example, from Motion-JPEG to MPEG. Or, motion video information be encoded as a synchronized television signal for recording on a video tape.

Motion video information may also need to be processed to add effects in an editing process, such as transition effects and titles. Such manipulation may require the steps of decompression of the video information, addition of the effect and compression of the resulting video information. These steps result in increased complexity because of a data flow path both to and from the compression/decompression circuitry.

Low cost video circuitry that is suitable for home use by a nonprofessional still should provide basic processing operations for capture, playback and manipulation of motion video information. Accordingly a general aim of the present invention is to provide a video processing circuit for connection to a computer which provides such functionality and which is capable of handling several data formats. Another general aim of the present invention is to provide a video capture circuit which can be connected to a standard bus interface such as a peripheral component interconnect (PCI) bus.

SUMMARY OF THE INVENTION

A digital motion video processing circuit can capture full-rate motion video information, e.g., at 60 fields per second, and playback full-rate motion video. Motion video information may also be manipulated to perform effects. The video processing circuit uses the system memory of a computer as a data buffer for holding compressed video data from the circuit. The system memory may be accessed by the circuit over a standard bus. A controller in the circuit directs data flow to and from either the standard bus or the input/output port through processing circuitry for compression, decompression, scaling and buffering. The standard bus may be a peripheral component interconnect (PCI) bus.

Multiple motion video formats can be processed without prior knowledge of the format by having a data path the includes both digital pixel data and timing data. The timing information includes information that defines the size of the image embodied in the pixel information, so each processing element, such as a compression processor or video encoder, can operate on an arbitrary size image (e.g., first and second fields of a frame), and in arbitrary video standards (e.g., NTSC and PAL in both square pixel and nonsquare pixel format such as CCIR rec 601-2 sampling also known as ITU-601-4), without prior knowledge of the image size or video standard.

Additionally, by having a video processing circuit with two types of compression processors, e.g., MPEG and JPEG processors, it is possible to perform conversion of these formats in one circuit. For example, MPEG-1 encoded data can be decoded, and the decoded data can be compressed using Motion JPEG compression.

Accordingly, one aspect of the present invention is a motion video processing circuit, or connection to a host computer having a processor and system memory, having an interpolation/decimation module having an input for receiving motion video information of a first image size and having an output providing motion video information defining a second image size smaller than the first image size; a compression/decompression circuit having an input for receiving the motion video information of the second frame size and output by the interpolation/decimation module and an output providing compressed motion video information such that decompression of a image of the compressed motion video information is performed without decompression of a subsequent or preceding image of the compressed motion video information; and the output of the compression/decompression circuit is connected to the system memory for using the system memory as a buffer memory; the compression/decompression circuit further has an input, connected to the system memory, for receiving the compressed motion video information and an output providing decompressed motion video information of the second image size according to the compressed motion video information; and the interpolation/decimation circuit farther has an input connected to the output of the compression/decompression circuit for receiving decompressed motion video information having the second image size and an output providing motion video information of the first image size according to the decompressed motion video information. In one embodiment, the video processing circuit has a second compression/decompression module.

Another aspect of the invention is a computer system having a processor; and system memory connected to the processor. An interface is also provided for connection to a peripheral motion video device. The peripheral motion video device includes a motion video capture and playback system having an interpolation/decimation module for adjusting the size of a video image compression/decompression circuitry allowing single image independent access and a path to system memory for use as a buffer.

Another aspect of the invention is a video processing circuit having an input for receiving pixel data and timing information. The video processing circuit includes a data compression circuit that uses the timing information to process the pixel data and to determine an image size for the pixel data. A data decompression circuit receives compressed data and converts the compressed data to uncompressed pixel data and timing data indicating the size of an image defined by the pixel data. The uncompressed pixel data and timing data are used by a video encoder to generate fall-rate motion video.

Another aspect of the invention is a motion video processing circuit having an input for receiving compressed motion video information in a first format. A first decompression circuit receives the compressed motion video information in the first format and converts the compressed motion video information into pixel data of the motion video. A second compression circuit receives the pixel data output by the first decompression circuit and performs compression on the pixel data into a second format different from the first format. In one embodiment of the invention the first decompression circuit is an MPEG decoder and the second compression circuit performs JPEG compression.

DETAILED DESCRIPTION

The present invention will be more completely understood through the following detailed description which should be read in conjunction with the attached drawing in which similar reference numbers indicate similar structures.

Figure 1:
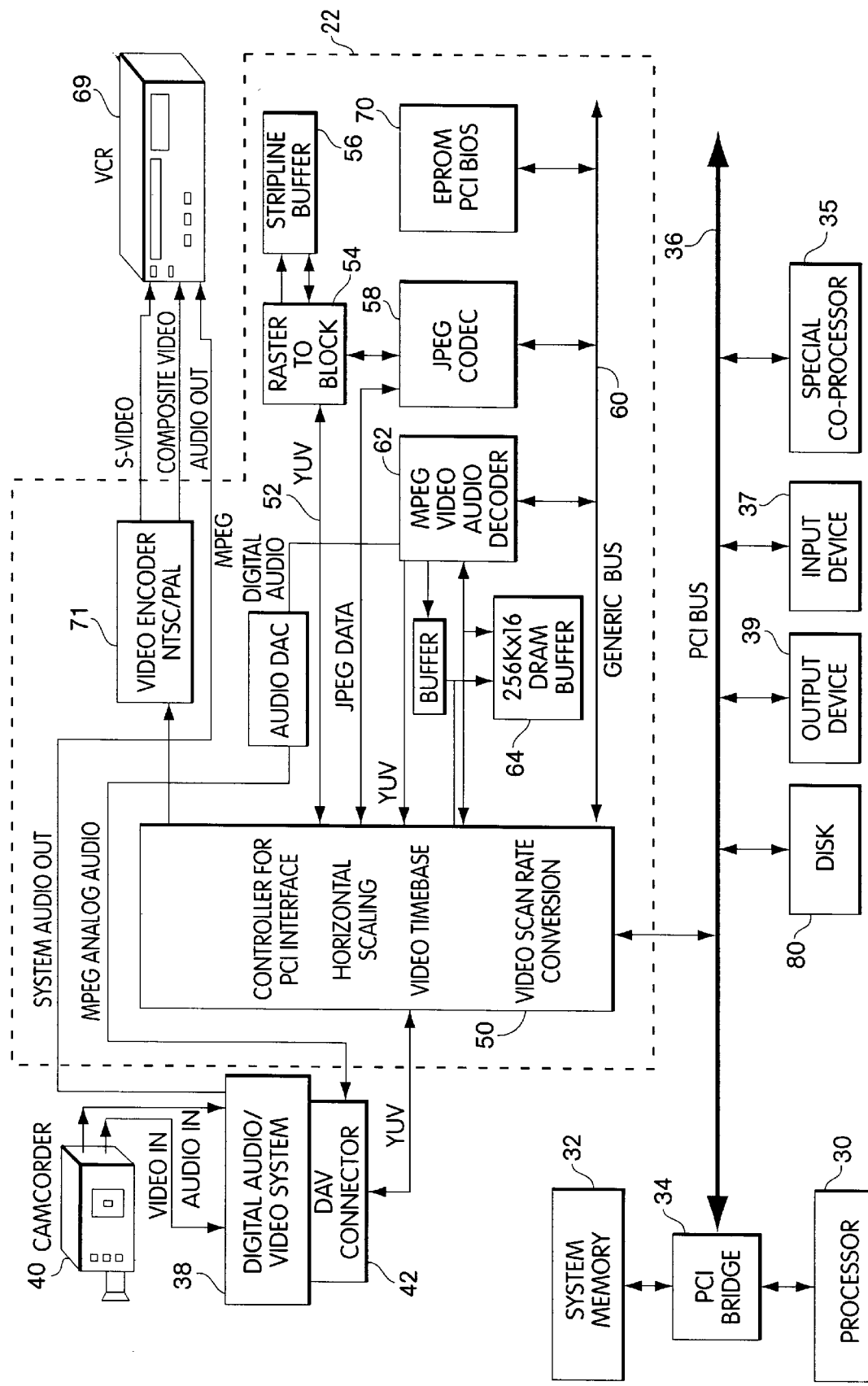
FIG. 1 is a block diagram of a computer system including a video processing circuit in accordance with the present invention.

FIG. 1 shows an overall block diagram of a video processing circuit 22 in accordance with the invention, in combination with an example computer system with which it may be used. The computer system includes a processor 30 connected to a system memory 32 via an interconnection mechanism 34. The interconnection mechanism 34 is typically a combination of one or more buses and one or more switches. In the embodiment shown in FIG. 1, the computer system has a peripheral component interconnect (PCI) bus 36, to which the system memory 32 and processor 30 are connected by a PCI bridge memory controller 34. One or more input devices 37 and output devices 39 are also connected to the PCI bus 36. A special-purpose processor 35 may also be used for performing specific functions, such as encoding/decoding of data, or complex mathematical or graphic operations. The computer system also includes an audio/video input/output system 38 through which analog audio and digital video information are provided. This audio/video input/output system can be connected to receive audio and video information input, for example from a camcorder 40. It may include, for example, a SAA7196 video decoder/scaler circuit from Philips Semiconductor, which generates square pixel frequencies.

Figure 2:
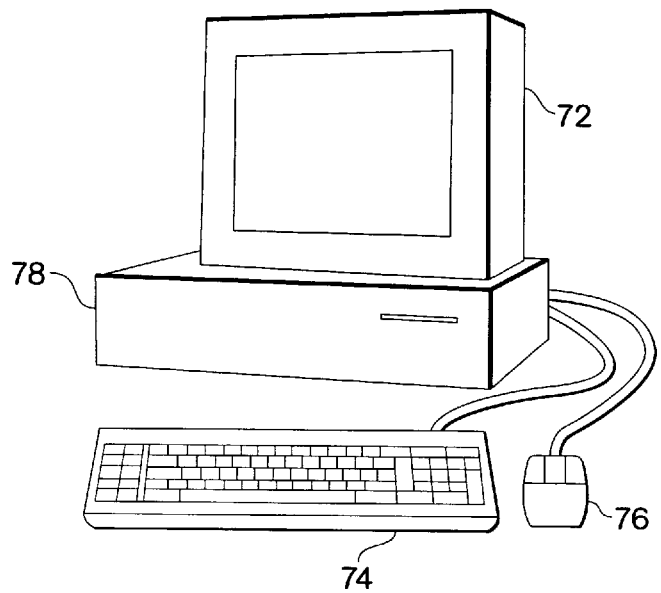
FIG. 2 is a perspective view of a computer system having a display showing one embodiment of the graphical user interface of the present invention.

FIG. 2 shows a perspective view of an example computer system. As shown in FIG. 2, the output device 39 may be a display 72 and the input device may be a keyboard 74 or mouse 76. The processor, interconnection mechanism and memory system typically are embodied in a main unit 78. It should be understood that one or more output devices may be connected to the computer system. Example output devices include a cathode ray tube (CRT) display, liquid crystal display (LCD), printers, communication devices, such as a modem, and audio output. It should also be understood that one or more input devices 37 may be connected to the computer system. Example input devices include a keyboard, keypad, trackball, mouse, pen and tablet, communication device, audio input and scanner. It should be understood that the invention is not limited to the particular input or output devices used in combination with the computer system or to those described herein. The input and output devices may be included within or external to the main unit 78.

The computer system may be a general purpose computer system, which is programmable using a high level computer programming language, such as "C++" or "Pascal". The computer system may also be implemented using specially programmed, special purpose hardware. In a general purpose computer system, the processor is typically a commercially available processor, such as the Power PC 603e RISC microprocessor. It may include a special purpose processor such as a CL560B JPEG compression/decompression chip, from C-Cube of Milpitas, Calif. Many other processors are also available. Such a processor executes a program called an operating system, such as the Macintosh operating system, such as Macintosh System Software, version 7.5.3, which controls the execution of other computer programs and provides scheduling, debugging, input output control, accounting compilation, storage assignment, data management and memory management, and communication control and related services. The processor and operating system define a computer platform for which application programs in high level programming languages are written. It should be understood that the invention is not limited to a particular computer platform, particular operating system, particular processor, or particular high level programming language. Additionally, the computer system may be a multi-processor computer system or may include multiple computers connected over a computer network. One embodiment of the present invention, is implemented using either a Macintosh Performa computer or Power Macintosh computer, with a PCI expansion slot and the Apple Video System, such as Performa 5400, 5420 or 6400 series computers or the Power Macintosh 7600 or 8500 series computers from Apple Computer of Cupertino, Calif. The computer system may also include an application for managing motion video files, such as the QuickTime 2.5 motion video system of Apple Computer.

Figure 3:
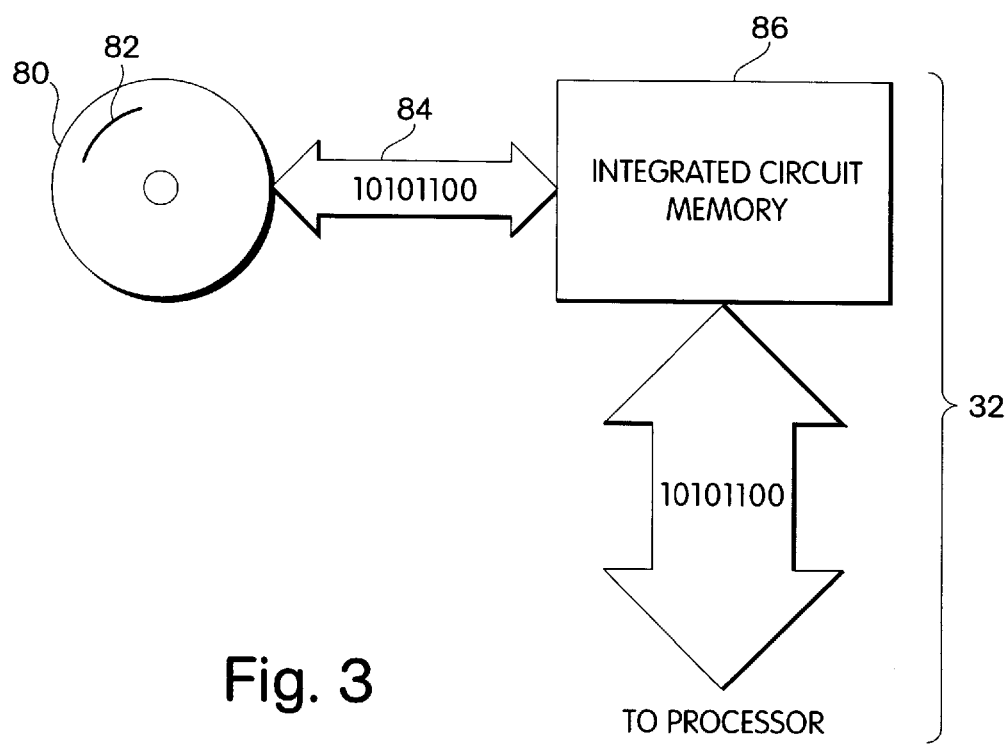
FIG. 3 is an example memory system shown in FIG. 1.

An example memory system 32 will now be described in more detail in connection with FIG. 3. A memory system typically includes a computer readable and writable non-volatile recording medium 80, of which a magnetic disk, a flash memory, and tape are examples. The disk may be removable, known as a floppy disk, and/or permanent, known as a hard drive. In particular, a PowerPC processor-based Macintosh Performa computer, having a gigabyte or more capacity hard disk drive and at least 16 to 24 megabytes of DRAM is preferred. The disk should have sufficient size to hold the video information to be edited, which is typically around 830 k bytes per second. The disk shown in FIG. 3 has a number of tracks, as indicated at 82, in which signals are stored, in binary form, i.e., a form interpreted as a sequence of 1's and 0's, as shown at 84. Such signals may define an application program to be executed by the microprocessor, or information stored on the disk to be processed by the application program, such as video information stored in a data file. Typically, in operation, the processor 30 causes data to be read from the non-volatile recording medium 84 into an integrated circuit memory element 86, which is typically a volatile random access memory, such as a dynamic random access memory (DRAM) or static memory (SRAM). The integrated circuit memory element 86 allows for faster access to the information by the processor and disk 80, and is typically called the system memory. The system memory may be used as a buffer between the disk and output device 39 or the video information, as will be described in more detail below. The processor generally causes the data to be manipulated within the integrated circuit memory 86 and copies the data to the disk 80 if modified, when processing is completed. A variety of mechanisms are known for managing data movement between the disk 80 and the integrated circuit memory 86, and the invention is not limited thereto. It should also be understood that the invention is not limited to a particular memory system.

Figure 4:
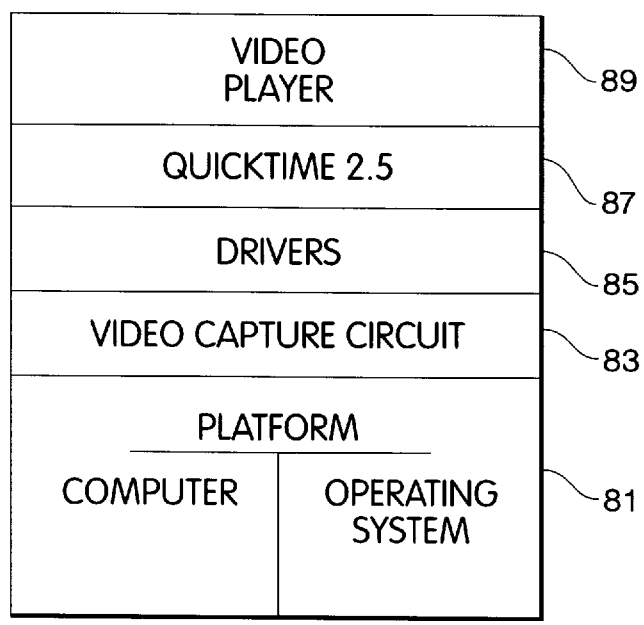
FIG. 4 is a diagram illustrating software layers in one embodiment of the present invention.

The different levels of software which interact in this computer system will now be described in more detail in connection with FIG. 4. Using a computer such as a Power Macintosh 7500 or 8500, using the System 7.5.2 operating system or higher, as indicated at 81, a video processing circuit is provided as indicated at 83. The QuickTime video system 87 interacts with the video processing circuit 83 via drivers 85. A video player system 89, such as the Apple Video Player, or other software, interacts with QuickTime 2.5. Application programs which manipulate video information typically interact with QuickTime 2.5, from which commands are issued to drivers which control the video processing circuit 83.

The video processing circuit 22 is connected to the computer system in two ways. First, it is connected via a connector 42 to the audio/video, input/output (A/V I/O) system 38, through which it receives digital motion video information in a YUV raster scan format, and timing information, and to which it outputs digital video information, timing information and analog audio information. The A/V I/O system 38 outputs system audio information to an output device such as a VCR. The video processing circuit 22 is also connected to the PCI bus 36.

The video processing circuit 22 includes a controller 50 which handles operations for interfacing to the PCI bus 36, for horizontal scaling, for video scan rate conversion, for video time base conversion and for controlling other components of the video processing circuit 22. These other components include JPEG compression/decompression circuitry including a raster to block converter 54, which uses buffer 56, and a JPEG codec 58. The JPEG codec may be a ZR36050 JPEG processor from Zoran; the raster to block converter may be a ZR36015 converter from Zoran. The buffer 56 may be an 8 K×8 stripline SRAM buffer and is used for raster to block conversion for the JPEG codes. The access speed of this SRAM is twice the pixel rate because both a read operation and a write operation are performed on each pixel. Another component is a video and audio encoder/decoder (codec) 62 for encoding and decoding MPEG format video and audio. The MPEG codec may be a CL480 MPEG decoder from C-Cube Corporation, which performs MPEG-1 IBBP real time decoding of a ISO11172 system level stream of MPEG-1 data without host intervention. This codec 62 uses a memory buffer 64 when decoding, and it may be implemented as a 256 K×16 dynamic random access memory (DRAM). This buffer also is shared with the controller 50 which uses it for pixel storage during JPEG compress and decompress. The controller may be implemented as a single custom integrated circuit.

Audio output by the codec 62 is also output to a digital-to-analog converter (DAC) 73 which output an analog audio signal to the A/V I/O system 38. An electronically programmable read-only memory 70, which includes the PCI BIOS, is connected to the controller 50. The controller 50 is also connected to a video encoder 71 which receives digital motion video information and timing information to generates S-Video or composite video signals in NTSC or PAL formats for output, for example, to a VCR 69. The timing information received by the video encoder 71 includes a composite blank signal and horizontal and vertical synchronization signals which define the size of each image, and which may be generated by the video timebase circuit 102. Because the video encoder generates a full-screen, full-motion standard NTSC or PAL signal from the video pixel data and timing information, the video processing circuit 22 can drive a standard TV monitor with either composite video or S-Video during MPEG-1 decode. The controller 50 controls these components and their interaction with the PCI bus 36 through a generic bus interface 60.

Figure 5:
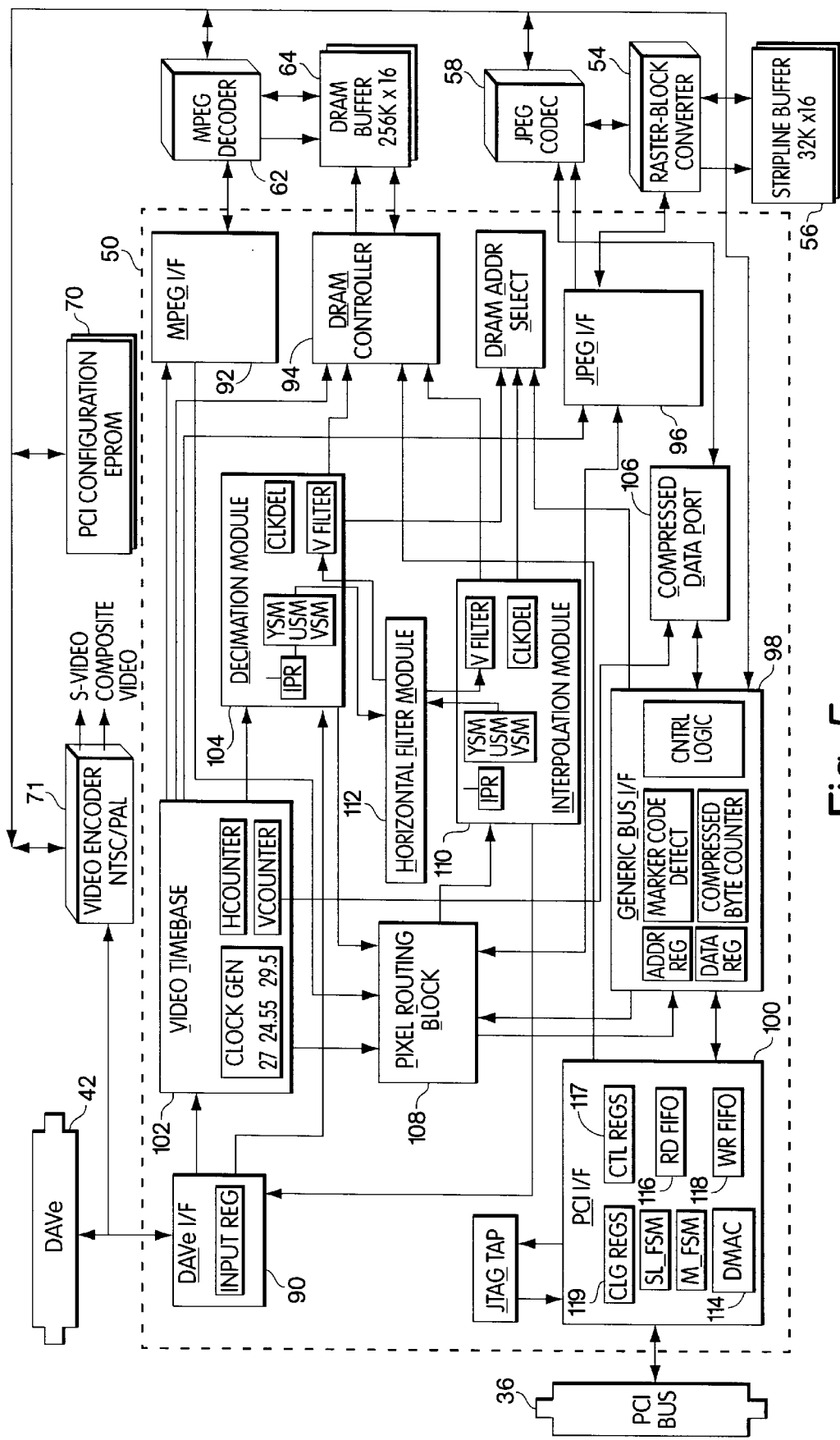
FIG. 5 illustrates more details of the controller 50 of the video processing circuit of one embodiment of the present invention.

The controller 50 and its interaction with these components will now be described in more detail in connection with FIG. 5. The controller 50 includes an interface to each of the primary components to which it is connected. A DAV interface 90 connects to the connector 42 to the A/V I/O system 38. An MPEG interface 92 connects to the MPEG codec 62. A DRAM controller 94 controls the DRAM buffer 64 used by the MPEG codec 62. A JPEG interface 96 is provided for controlling the raster block converter 54 and JPEG codec 58. A PCI interface 100 is used to connect to the PCI bus 36. A generic bus interface (GBIF) 98 is implemented to control access to the generic bus 60 by the PCI configuration EPROM 70, MPEG decoder 62, JPEG codec 58 and video encoder 71 and to provide a data path that is used to transfer data to/from the JPEG and MPEG codecs, including the transfer of pixel data during various effect rendering modes. The generic bus interface also is used to fetch data from the EPROM 70. The interfaces 90, 92, 94, 96, 100 and 98 are described in more detail below.

The controller 50 also includes a video time base generator circuit 102 which receives signals from the DAV interface including horizontal and vertical counter information for the received raster scan image. The DAV interface provides, for example, an indication of whether a given field is the first or second field of a given frame, this indication being derived from the relation of the signal indicating the width of the image and the signal indicating the height of the image. It also includes clock generation circuitry for generating 27, 24.55 and 29.5 MHZ signals for processing video information, depending on the mode of operation. The clock generator also generates a signal at twice the video clock rate and a clock qualifier signal which indicates which pulse in each pair of pulses corresponds to the video clock rate. In square pixel NTSC mode the clock is 24.5454 MHZ. In square pixel PAL mode the clock is 29.5 MHZ. In nonsquare pixel mode the clock is 27 MHZ. One of these three video clock signals is selected for use as the internal pixel clock by the pixel routing block 108. The digital audio clock domain used during MPEG playback operates at 11.29 MHZ for the audio which is sampled at a 44.1 KHz rate. Otherwise, audio clock pulses from the audio subsystem of the host computer system, received through the DAV interface 90 are counted. The count is sampled at the end of each video frame and is used to synchronize audio information to the video information. The PCI interface 100 of the controller operates at a frequency of 33 MHZ. The video time base information is provided to the MPEG interface 92, the DRAM controller 94, the JPEG interface 96, a decimation module 104, a compressed data port 106 and a pixel routing block 108. The functions of these modules will be defined in more detail below.

The controller 50 also handles conversion of an image between a full-screen, full-motion video format, such as a 640×480, 60 fields per second, two fields per frame video, and a SIF format having 320×240 pixels, and 30 frames per second (for NTSC video). On input, this conversion is performed by decimation module 104 and horizontal filter module 112 at the full input rate. For output, each SIF frame is interpolated to produce, at the full rate (e.g., 60 fields per second), two full-screen fields using interpolation module 110 and horizontal filter module 112. The horizontal filter module 112 may perform, for example, a seven-tap finite impulse response (FIR) filter operation on the horizontal line.

The pixel routing block 108 of the controller 50 is used to route pixel data and timing data from any input to any output. In particular, it directs data to and from the generic bus interface, the JPEG interface, the MPEG interface and the interpolation and decimation modules according to the selected clock signal from the video timebase generator 102. Pixel data received by the DAV interface is directed to the decimation module, while timing signals are provided to the video time base generator circuit for generation of the timing data to be used by the other components in the video processing circuit. The decimation module uses the timing data to determine a correct output size of a decimated image. The timing data is then changed by the decimation module when the data is passed to, for example the JPEG codec 58. Each component of the system uses the timing data to determine the size of each image. This timing data path avoids the need for each component to have prior knowledge of the size of an image being processed. To an end user, this capability of the circuit to process incoming video signals of a variety of formats without prior knowledge of the format causes the video format information to be transparent to the user, who may not be familiar with the difference between video formats in the first place.

The interfaces in the controller 50 will now be described in more detail.

The PCI interface 100 implements a standard PCI configuration space and is used for all communication between a host computer system and for all memory transfers between the video processing circuit and the system memory. Dual address cycle and special cycle modes may be unsupported. The PCI interface enables the video processing circuit 22 to act as a slave device (target) or as a full bus master to move data between system main memory and the video processing circuit 22. More details on the contents and operation of the PCI configuration space, the PCI interface signals and their use are found in the *PCI Local Bus Specification*, Revision 2.0, particularly Chapter 6. In one embodiment, the PCI configuration can have the following values:

base__class: 04h, to indicate a multimedia device;
sub__class: 00h, to indicate a video device;
prog__int__class: 00h, to indicate that a special programming interface model is not supported;
imp__master: 'supported', to indicate device is master capable;
imp__VGA: 'not supported', to indicate VGA support is not required;
dev__sel__tim: 'slow', to indicate the speed at which the circuit can turn around DEVSEL;
reg__lay__code: 0;
exp__rom__base: set to the base address register of the expansion ROM 70;
int__Line: 'INTA', to indicate an interrupt line;
min__gnt: 0×01 (0.25 microseconds);
max__lat: 0×0A (2.5 microseconds); and
ad__stepping: 'not supported'.

The interface includes a read buffer 116, implemented as a first-in, first-out (FIFO) memory and a write buffer 118, also implemented as a FIFO, along with control and configuration registers 117 and 119. The master interface also has two direct memory access (DMA) channels 114. One DMA channel is used to transfer information form the PCI bus 62 to the generic bus interface 60. The other channel is used to transfer information form the generic bus interface 60 to the PCI bus 62. The master interface generally is used to transfer pixel data. The PCI interface 100, under most conditions, performs a READ Line or Write Line burst mode transfer to optimize performance on the PCI bus 36. The target portion of the PCI interface is used primarily to transfer control information between the host and the controller, JPEG codec, MPEG codec, EPROM, and video encoder. The target interface does not support PCI burst mode transfers because it is used only to setup the components of the video processing circuit 22.

The PCI interface 100 has two clock domains. The standard PCI interface portion which interfaces directly to the PCI bus itself is in the PCI clock domain (typically 33 MHZ). The second portion, which interfaces with the video processing portion of the video processing circuit 22 is in the video clock domain.

Read transfers performed by the video processing circuit 22 through the PCI interface 100 are initiated by issuance of a memory read line command by the PCI interface acting as a bus master. The interface requests a full cache line transfer starting on a full cache line boundary in order to optimize PCI bus utilization. As a target, the PCI interface 100 responds to memory read line and memory read multiple commands as if they are memory read commands. If an attempt is made to read more than a single 32 bit word from the PCI interface, the interface issues a disconnect command after the first word is transferred.

Write transfers performed by the video processing circuit 22 through the PCI interface 100 acting as a master are initiated by either a memory write and invalidate command or a memory write command. A memory write and invalidate command is used to perform writes in full cache line bursts in order to optimize PCI bus utilization. Even if a transfer does not start on a full cache line boundary, memory writes are performed until the transfer does fall on a cache line boundary, after which time memory write and invalidate commands are used. As a target, the PCI interface 100 responds to memory write and memory write and invalidate commands as if they were memory write commands. If an attempt is made to write more than a single 32 bit word to the PCI interface, the interface issues a disconnect command after the first word is transferred.

Cache line alignment of the PCI data transfers optimizes system resources such as the PCI bus, system bus and memory system bandwidth because memory systems generally handle most efficiently transfers that are a multiple of the cache line size. The system cache line size is specified in the PCI configuration space. The PCI bus also utilizes better the PCI bus bandwidth by operating in a burst mode. Therefore, burst transfers on the PCI bus that are multiples of the cache line size allow more data to be transferred for the available bus cycles.

Enforcing such cache alignment of transfers is done differently depending on whether the video processing circuit is reading from or writing to the system memory. When data is being written to system memory, the burden of forcing cache line alignment of data is placed on any software that is allocating buffers in which data is to be written. The start and end address of each write buffer should be placed by such software on a full cache line boundary. In this manner, subsequent writes to memory also fall on a cache line boundary since write transfers are done using a full cache line. Since software does not have as much control over boundary alignment of read buffers as write buffers, the PCI interface forces transfers to fall on cache line boundaries. If the DMA buffer does not start on a cache line boundary, cache line alignment is obtained by make the first transaction transfer data until cache line alignment is obtained, as described above. Subsequent transfers are then full cache line transfers.

The GBIF 98 is the interface to the bus 60 which provides the data paths and control paths for the JPEG codec 58 and MPEG codec 62. The PCI EPROM also uses this interface for all transfers. In one embodiment, the bus 60 has an 8-bit data path, a 10-bit multiplexed address path and four select lines. The bus 60 supports two different types of bus protocols or cycle types, including 68000-type transfers which are terminated by an acknowledgment ("ACK") signal (herein called mode 1), and timed I/O cycles where a command (CMD) signal is active for a predetermined period of time (herein called mode 0). Each select line controlled by the GBIF 98 is programmable to communicate using either of these two modes. If mode 0 is used, then an associated cycle timing register is loaded to define the minimum cycle time of the device under control. This time is measured according to the value of the clock signal associated with a selected video mode. This cycle time accordingly should be associated with the fastest possible rate, which would be 29.5 MHZ when for square pixel PAL video mode. In this case a timed I/O cycle for a 250 ns EPROM would require eight clocks cycles, for a total of 272 ns. If mode 1 is used, then GBIF waits for an "ACK" signal from the device selected by the select line.

There are three operational modes of the GBIF 98: EPROM access (using mode 0 cycles), DMA access and random register access (both using mode 1 cycles). In EPROM access mode, a 10-bit address along with an EPROM select signal is passed from the PCI Interface 100. The PCI interface converts a read access request into four read commands to the GBIF. The GBIF performs a read of the 8-bit wide EPROM for each command issued by the PCI Interface. The GBIF passes each byte to the PCI Interface 100, which packs them into 32-bit long words and passes the long words to the PCI bus master. The EPROM access path also has support for a write operation which supports use of a FLASH ROM.

In the DMA access mode, which is used only for MPEG compressed data transfers, the GBIF initiates all cycles for moving data to the MPEG decoder. In response to request for data on the bus 60, the GBIF transfers data from the PCI interface 100 to the MPEG decoder. The GBIF also unpacks data from the PCI interface.

In random register access mode, an 18-bit address is passed to the GBIF from the PCI interface 100 and is placed on the bus 60. This address addresses a single word or byte register in the video processing circuit. The data that is transferred into or from the address retains its relative byte position and is not packed into a long word.

The DAV interface 90 in one embodiment of the invention is the digital video and audio interface to the computer platform, for example, the Apple Performa computer using the System 7.5.3 operating system, and connects to DAV connector 42. All digital video in and out of the video processing circuit 22 pass through the DAV connector 42 with the exception of encoded analog S-Video and Composite Video which have separate connectors. More details concerning the video and timing outputs of the DAV connector that are received by video processing circuit 22 may be found in the specification for the SAA7196 chip from Philips Semiconductor and the specification of the Apple DAV system from Apple Computer. MPEG decoded digital audio is processed by the DAC 73 and is passed across the DAV connector 42 as analog audio. An audio clock is provided by an audio sub-system in the host computer system and is sent to the video processing circuit 22 through the DAV connector 42.

In an embodiment using an Apple Perform computer with an Apple Audio/Video Input/Output system, video data transfer across the DAV interface can occur in one of four modes, depending on whether the computer system or the video processing circuit controls the clock, synchronization, the data signals. In mode 0, data flows from the video input source to a graphics sub-system memory regardless of whether or not the video processing circuit 22 is present. When present, the video processing circuit 22 can capture data but does not drive the data. This mode is the default mode. In mode 2, the video processing circuit supplies clock and synchronization signals and drives data into the system through DAV 42. This mode is used for all decompression functions using both JPEG and MPEG decompression. Two modes, 1 and 3, are not used. In mode 1, clock and synchronization signals are derived by the computer system and any circuit connected to DAV 42 drives data into the system. In mode 3, video processing circuit uses clock signals from the system to generate synchronization signals and drive data into the system.

Digital video pixel data that are passed across the DAV connector 42 are full two-field-per-frame format video. For square pixel NTSC format, each field is 640 horizontal pixels by 240 lines and is received at 60 fields per second with a pixel clock rate of 12.2727 MHZ. For square pixel PAL format, each field is 768 horizontal pixels by 288 lines and is received at 50 fields per second with a pixel clock rate of 14.75 MHz. For nonsquare pixel NTSC format, each field is 720 horizontal pixels by 243 lines and is received at 60 fields per second with a pixel clock rate of 13.5 MHZ. For nonsquare pixel PAL format, each field is 720 horizontal pixels by 288 lines and is received at 50 fields per second with a pixel clock rate of 13.5 MHz. The DAV port supplies video timing (clock and synchronization signals) to the video processing circuit 22 only during compression mode. In all other modes, the DAV port is slaved to the timebase generated by the video processing circuit 22 using video timebase circuit 102.

The DRAM controller 94 controls access to the DRAM buffer 64 by the MPEG decoder 62 and the controller 50. The controller 50 takes control of the DRAM buffer by asserting a signal to two external tri-state buffers which tri-state address and control lines coming from the MPEG decoder. The controller waits one pixel clock time and then enables its own pins which drive the DRAM address and control lines. The DRAM buffer is then dedicated to the controller 50 which uses it as temporary storage of video pixels which are being processed by the filter units, including interpolation module 110 and decimation module 104. The DRAM controller keeps track of the current line and horizontal position on the line using a set of counters, which count active lines and pixels. This information is used to generate addresses to which data is written or from which data is read by the decimation or interpolation modules 104 and 110. Control of RAS, CAS, WE, OE, address and data signals to the DRAM, and enable lines to the external tri-state buffers are controlled by a clock signal having twice the video clock rate.

The JPEG interface 96 transfers uncompressed pixel data and timing data between the controller 50 and the JPEG codec 58. It is a bidirectional interface. Timing data informs the codec 58 about frame boundaries of the image. During compression, uncompressed pixel data flows from the pixel routing block through this interface to the JPEG codec 58. During decompression, uncompressed pixel data flows from the JPEG codec 58 through this interface to the pixel routing block 108. This interface is also used for register access to the raster-to-block onverter 54.

Similarly, the compressed data port 106 transfers compressed pixel data between the controller 50 and the JPEG codec 58. It is a bidirectional interface. This data port is synchronous with the video clock domain and is thus clocked by the same clock signal as the JPEG interface 96. The data port supports byte transfers at a rate which can be as high as one byte per clock. In SIF mode, this rate is roughly 14.75 Mbps for square pixel PAL images.

The MPEG interface 92 transfers uncompressed pixel data from the MPEG decoder 62 to the controller 50. It is a unidirectional interface. Pixel data received through the MPEG interface 92 is directed to the pixel routing block 108.

Figure 6:
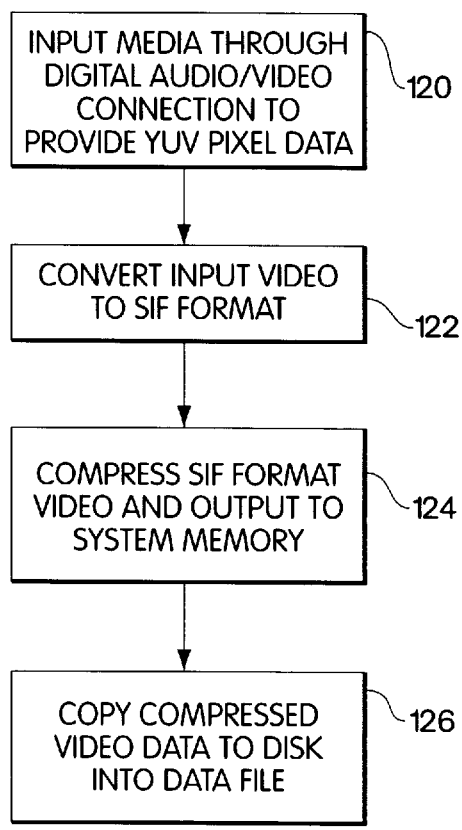
FIG. 6 is a flow chart describing how motion video data is captured and compressed.

Compression of video will now be described in connection with FIG. 6. First step of this process is inputting the media through the digital audio/video connection to provide a digital format data, for example, in an interlaced YUV 4:2:2 format in step 120. Video images enter the system from a video source such as a tape or directly off the air, for example from a television tuner. As described above, the video information received by the DAV interface 90 is in raster scan format and thus is received as a sequential series of pixels. The input video is then converted by the controller to a single image format (SIF) frame by combining full two field data into a single frame and by reducing the size of the image (step 122). The SIF format video images are then compressed using the JPEG codes and are output to the system memory through the PCI interface 100 in step 124. In this step, the SIF image data is directed through the pixel routing block 108 through the JPEG interface 96 to the raster-to-block converter 54. The JPEG codec reads the data from the raster-to-block converter 54, compresses it, outputs the compressed data into the compressed data port 106. Data is read by the GBIF 98 from the compressed data port 106 to the PCI interface. The host computer reads the data from the PCI interface into the system memory. The video information in the system memory is then copied to disk into a data file in step 126.

When transferring data through the PCI Interface 100 during video capture, it is desirable to pack several frames of video into a single buffer in the system memory. In order to efficiently use memory, data for a frame is sometimes split by the controller 50 between two buffers. The process of splitting a data transfer across multiple areas of memory is typically called scatter/gather or data chaining. However, the data rate is high enough that there is a minimal amount of time for the controller 50 to switch between buffers.

To handle the difficulty of switching between buffers for data chaining, the PCI interface has, for each DMA channel, two sets of buffer pointer and word count registers. These two sets of registers eliminate the latency involved in setting up the next set of buffer pointer and word count registers at the end of a buffer transfer. Consequently, each DMA channel is capable of transferring several buffers worth of data to host memory continuously even if a buffer ends in the middle of a frame. The register set that is directly loaded by the host software is referred to as the shadow register set. The register set that is engaged in the bookkeeping of an ongoing DMA data transfer is referred to as the active register set.

The host computer initially loads both the shadow and active register sets. When the active word count register decrements to zero, the contents of the shadow register set are transferred to the active register set. An interrupt is sent to the host when the word count is zero. The host computer then has the transfer time of the next buffer to reload the shadow register set for the third buffer transfer. As long as the host can respond to the interrupt when the word count reaches zero to reload the idle set of buffer address and word count registers before the presently active word count register reaches zero, the data chaining will be transparent to the data transfer operation.

An alternate method for managing the loading of the active register set is to load initially only one set of registers. The registers are then loaded upon receipt of an interrupt indicating that that shadow set is empty and the channel run bit is active or by an interrupt indicating the end of a channel. Both of these interrupts occur at the same time when the active word counter reaches zero if the valid bit is set in the shadow register. If the shadow register is not valid at the time when the active word counter reaches zero, only a channel end interrupt is generated.

Shadow buffer address and word count registers are loaded to the active register whenever the word count register reaches zero if the shadow set is valid. The size of the word count register should be about 22 bits. Since the word counter actually counts the number of full 32 bit words that are being transferred, a 22 bit word counter allows for a 16 MByte transfer size.

Another issue to address when handling motion video information is the detection of the frame boundaries. During data capture, or compression, mode, a frame pointer register is used to help the host computer determine the location of frame boundaries. One interrupt generated at the time when the frame pointer register is loaded is a frame end interrupt. The frame boundaries, however, are within buffers which contain multiple frames. The GBIF, as part of special processing at frame boundaries, detects an end of frame condition and passes this data to the PCI interface. A problem created by data chaining placing the proper value in the frame pointer register, which cannot be loaded until the system knows the buffer in which the frame marker will be stored.

To handle the problem of determining the buffer holding a frame marker, each word of data is examined as it is read from the write FIFO of the PCI interface. The least significant 16 bits of each data transfer is compared to the frame marker code. When the DMA engine detects the marker code when moving the data to the PCI bus, the frame pointer register should be loaded with the value of the buffer pointer in the active register set.

It is possible that the host computer may not read the frame pointer register before another frame boundary occurs. Accordingly, a frame pointer overrun bit is provided to inform the host when such a condition occurs. In such a case, the host computer recovers from such an error by searching through the buffer from the previous frame pointer to locate the missing frame marker.

Figure 7:
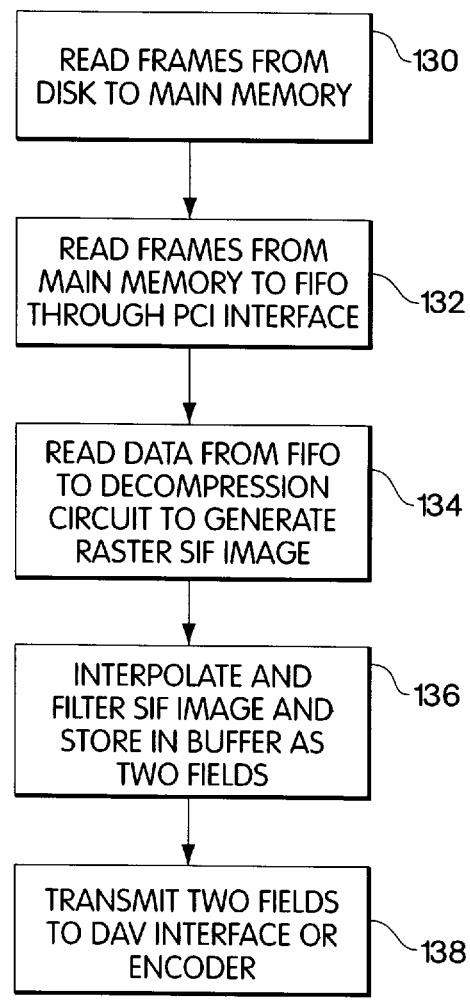
FIG. 7 is a flow chart describing how motion video data is decompressed and played back.

Decompression of the video information will now be described in more detail in connection with FIG. 7. Decompression involves the reverse sequence of steps as compression. First, in step 130, frames are read from the disk into the system memory. These frames from the main memory are transferred over the PCI bus to be buffered in the PCI interface 100 in step 132. Data is then read from the PCI interface to the decompression circuitry to be decompressed and converted from block to raster pixel data, to produce a SIF image in step 134. SIF image is then interpolated and filtered back to a full frame size in step 136. It is stored in the DRAM buffer 64 to be output as two fields. These two fields are then transmitted to the DAV interface 90 or encoder 71 instep 138.

Figure 8:
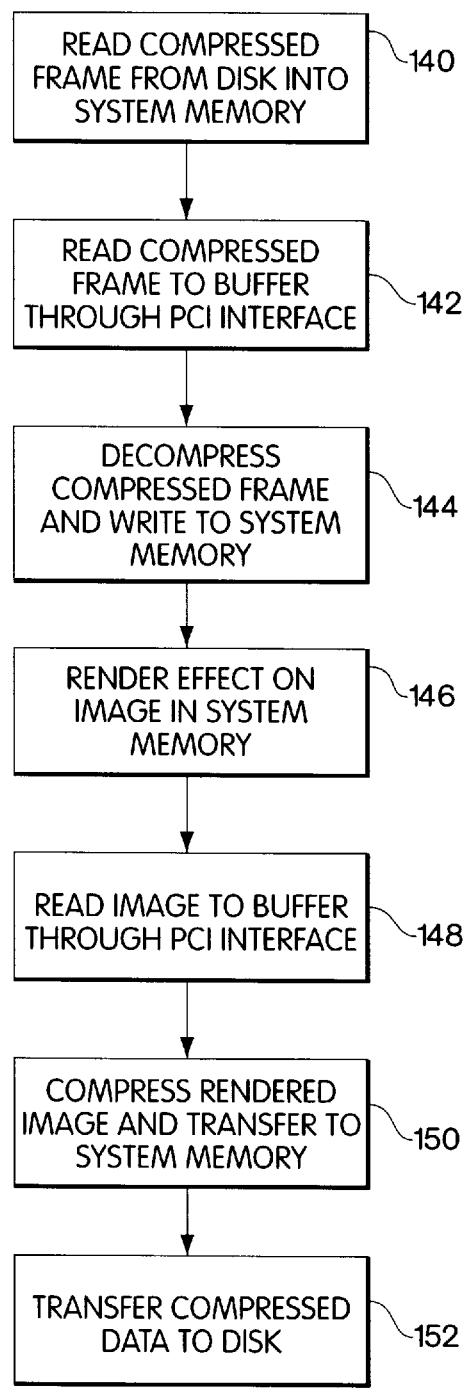
FIG. 8 is a flow chart describing how effects are rendered.

Rendering of effects on motion video information will now be described in more detail in connection with FIG. 8. This process receives an indication of the images to be used to generate a special effect and an indication of the effect to be performed from, for example, an application program for editing the motion video information. Such an application program is described in more detail in a U.S. patent application entitled "Graphical User Interface for a Motion Video Planning and Editing System for a Computer", by Kevin Foreman et al., filed Jul. 29, 1996 and assigned to Avid Technology, Inc., of Tewksbury, Mass., which is hereby incorporated by reference. The process of FIG. 8 is performed for each frame or pair of frames involved in an effect to generate each output frame of the effect. First, the compressed frame data is read from disk in step 140 and transferred to system memory. The compressed frame is transferred to the video processing circuit over the PCI bus and is buffered in the PSI interface 100, in step 142. The compressed frame is then decompressed and written back to system memory in step 144. The effect is then performed on the image or images in the system memory by other software in step 146. The resulting image with the rendered effect is then transferred to the video processing circuit 22 over the PCI bus and is buffered in PCI interface 100 in step 148. The video processing circuit 22 then compresses the image and transfers the compressed data back to system memory through the PCI interface 100 in step 150. The compressed data containing the image is then stored to a data file on disk in step 152.

Figure 9:
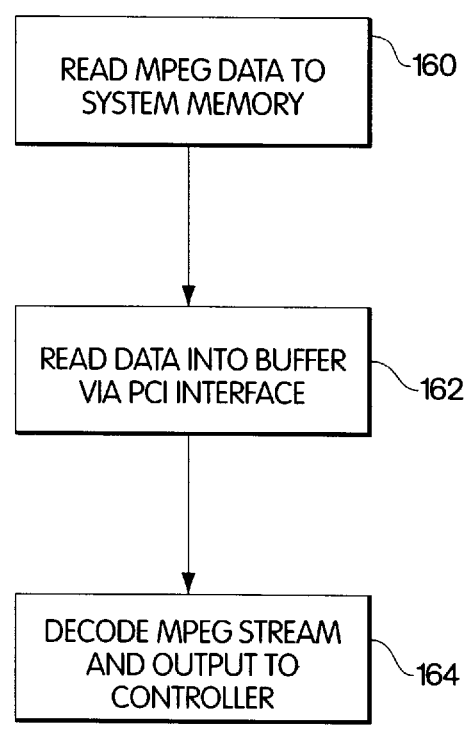
FIG. 9 is a flow chart describing how MPEG encoded motion video data is decoded.

Playback of MPEG encoded video will now be described in more detail in connection with FIG. 9. Decoding of MPEG encoded data involves reading data, typically from a CD ROM or hard drive into system memory as indicated in step 160. Next, the MPEG decoder 62 is instructed to fetch the data from the system memory into the DRAM buffer 64 through the PSI interface in step 162. The MPEG decoder then reads the MPEG encoded system stream to decode both video and audio information. The MPEG decoder handles all video and audio synchronizing issues within the stream and performs frame to field conversion. Two fields of video data are then passed to the controller 50 through the MPEG interface 92, where they are routed to the DAV interface through pixel routing block 105 and interpolation module 110. Through the DAV interface, full screen image data is provided to both the DAV connector and the encoder 71.

Using the MPEG-1 decoding mode, it is also possible to convert MPEG-1 encoded video streams into Motion JPEG video streams using video processing circuit 22. This conversion is performed by controlling the pixel routing block 108 to direct the decompressed video data from the MPEG decoder 62 to the JPEG interface 96. In this conversion process, MPEG-1 compressed data is received through the PCI interface 100 from a buffer in system memory 32 of the host computer. The GBIF 98 then directs the compressed data to the MPEG decoder 62. Decoded video data is then output to the controller 50 through MPEG interface 92. The controller 50 then routes the video data through the pixel routing block 108 to the JPEG interface 96 to the JPEG codec 58. Compressed data is then output from the JPEG Codec 58 to the compressed data port 106. The GBIF then reads the data from the compressed data port 106 and provides the data to the PCI interface 100. The PCI interface 100 transfers the JPEG compressed data to a separate buffer in the system memory, to complete the conversion process.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A motion video processing circuit for processing different video formats, for connection to a host computer having a processor and system memory, comprising:

an interpolation/decimation module having an input for receiving pixel data from a first data path and pixel timing data from a second and separate data path of images of full-rate motion video of a first image size defined by the pixel timing data and having a first output providing pixel data and a second output providing pixel timing data of images of motion video of a second image size smaller than the first image size and defined by pixel timing data;

a first compression/decompression circuit having an input for receiving pixel data from the first output of the interpolation/decimation module and pixel timing data from the second output of the interpolation/decimation module of images of the motion video of the second frame size and an output providing compressed motion video information using intraframe compression; and a second compression/decompression circuit, having an input for receiving pixel data from the first output of the interpolation/decimation module and pixel timing data from the second output of the interpolation/decimation module of images of the motion video of the second frame size and an output providing compressed motion video information using interframe compression;

wherein the outputs of the first and second compression/decompression circuits are connected to the system memory for using the system memory as a buffer memory;

wherein the first compression/decompression circuit further has an input, connected to the system memory, for receiving the intraframe compressed motion video information and a first output providing decompressed motion video pixel data and a second output providing pixel timing data of the second image size according to the compressed motion video information;

wherein the second compression/decompression circuit further has an input, connected to the system memory, for receiving the interframe compressed motion video pixel data and pixel timing data and a first output providing decompressed motion video pixel data and a second output providing pixel timing data of the second image size according to the compressed motion video information; and wherein the interpolation/decimation circuit further has an input connected to the output of the first and second compression/decompression circuits for receiving decompressed motion video pixel data and pixel timing data having the second image size and a first output providing fall-rate motion video pixel data and a second output providing pixel timing data of the first image size according to the decompressed motion video pixel data and pixel timing data.

2. A computer system for processing different video formats, comprising:

a processor;

system memory connected to the processor; and an interface connected to the processor and the memory and for connection to a peripheral motion video device, wherein the peripheral motion video device, comprises a motion video processing circuit, comprising:

an interpolation/decimation module having an input for receiving pixel data from a first data path and pixel timing data from a second and separate data path of images of full-rate motion video of a first image size defined by the pixel timing data and having a first output providing pixel data and a second output providing pixel timing data of images of motion video of a second image size smaller than the first image size and defined by pixel timing data;

a first compression/decompression circuit having an input for receiving pixel data from the first output of the interpolation/decimation module and pixel timing data from the second output of the interpolation decimation module of images of the motion video of the second frame size and an output providing compressed motion video information using intraframe compression; and a second compression/decompression circuit, having an input for receiving pixel data from the first output of the interpolation/decimation module and pixel timing data from the second output of the interpolation decimation module of images of the motion video of the second frame size and an output providing compressed motion video information using interframe compression;

wherein the outputs of the first and second compression/decompression circuits are connected to the system memory for using the system memory as a buffer memory;

wherein the first compression/decompression circuit further has an input, connected to the system memory, for receiving the intraframe compressed motion video information and a first output providing decompressed motion video pixel data and a second output providing pixel timing data of the second image size according to the compressed motion video information;

wherein the second compression/decompression circuit further has an input, connected to the system memory, for receiving the interframe compressed motion video information and a first output providing decompressed motion video pixel data and a second output providing pixel timing data of the second image size according to the compressed motion video information;

wherein the interpolation/decimation circuit further has an input connected to the output of the first and second compression/decompression circuits for receiving decompressed motion video pixel data and pixel timing data having the second image size and a first output providing full-rate motion video pixel data and pixel timing data of the first image size according to the decompressed motion video pixel data and pixel timing data; and an output video encoder having an input connected to receive the full-rate motion video from the interpolation/decimation circuit to generate a synchronized video output signal.

3. A digital motion video processing circuit for processing different video formats having an input for receiving pixel data from a first data path of images of a fall-rate motion video sequence and pixel timing data from a second and separate data path which defines a size of each of the images, comprising:

an interpolation/decimation module having an input for receiving the pixel data from the first data path and pixel timing data from the second data path of images of the full-rate motion video sequence and having a first size defined by the pixel timing data and having a first output providing pixel data and a second output providing pixel timing data defrning a second motion video sequence wherein each image has a second size smaller than the first size defined by pixel timing data;

a compression/decompression circuit having an input for receiving the pixel data from the first output of the interpolation/decimation module and pixel timing data from the second output of the interpolation/decimation module of the second motion video sequence and an output providing compressed motion video information; and wherein the compression/decompression circuit further has an input for receiving compressed motion video information and a first output for providing decompressed motion video pixel data and a second output for providing pixel timing data of the second image size according to the compressed motion video information; and wherein the interpolation/decimation circuit further has a first input connected to the first output of the compression/decompression circuit for receiving decompressed motion video information and a second output providing pixel timing data defining the second image size and a first output providing full-rate motion video pixel data and a second output providing pixel timing data of the first image size according to the decompressed motion video pixel data and pixel timing data.

4. A motion video processing circuit for processing different video formats and for converting compressed motion video data in a first interframe compressed format to compressed motion video data in a second intraframe compressed format, comprising:

a first memory for storing compressed motion video data;

a decompression circuit for decompressing compressed motion video data of the first format having an input for receiving the compressed motion video data in the first compressed format from the first memory and a first output providing uncompressed motion video pixel data and a second output providing pixel timing data which defines a size of an image defined by the pixel data;

a second memory for storing uncompressed motion video data having a first input connected to the first output of the decompression circuit and a second input connected to the second output of the decompression circuit and having a first output and a second output; and a compression circuit for compressing uncompressed motion video pixel data into the second compressed format and having a first input connected to the first output of the second memory to receive the pixel data and a second input connected to the second output of the second memory to receive the pixel timing data and an output providing compressed motion video data in the second compressed format to the first memory.

5. The motion video processing circuit of claim 4, wherein the decompression circuit decodes image data compressed using interframe compression based on discrete cosine transforms and the compression circuit compresses the decoded image data using intraframe compression based on discrete cosine transforms.

6. The motion video processing circuit of claim 1, wherein the first compression/decompression circuit uses intraframe compression based on discrete cosine transforms and wherein the second compression/decompression circuit uses interframe compression based on discrete cosine transforms.

7. The motion video processing circuit of claim 1, wherein the pixel timing data which defines a size of the image includes the number of pixels per line and the number of lines per image.

8. The motion video processing circuit of claim 2, wherein the pixel timing data which defines a size of the image includes the number of pixels per line and the number of lines per image.

9. The motion video processing circuit of claim 3, wherein the pixel timing data which defines a size of the image includes the number of pixels per line and the number of lines per image.

10. The motion video processing circuit of claim 4, wherein the pixel timing data which defines a size of the image includes the number of pixels per line and the number of lines per image.

11. The motion video processing circuit of claim 1, further comprising a circuit to generate pixel timing data, which is used to determine the size of the image, for multiple motion video formats without prior knowledge of the format or size of the image.

12. The motion video processing circuit of claim 2, further comprising a circuit to generate pixel timing data, which is used to determine the size of the image, for multiple motion video formats without prior knowledge of the format or size of the image.

13. The motion video processing circuit of claim 3, further comprising a circuit to generate pixel timing data, which is used to determine the size of the image, for multiple motion video formats without prior knowledge of the format or size of the image.

14. The motion video processing circuit of claim 4, further comprising a circuit to generate pixel timing data, which is used to determine the size of the image, for multiple motion video formats without prior knowledge of the format or size of the image.

* * * * *